United States Patent
Sletten

[11] 4,171,695
[45] Oct. 23, 1979

[54] IMAGE COLLAPSING CONCENTRATOR AND METHOD FOR COLLECTING AND UTILIZING SOLAR ENERGY

[75] Inventor: Carlyle J. Sletten, Acton, Mass.

[73] Assignee: Solar Energy Technology, Inc., Bedford, Mass.

[21] Appl. No.: 838,910

[22] Filed: Oct. 3, 1977

[51] Int. Cl.² .................................................. F24J 3/02
[52] U.S. Cl. .................................. 126/438; 350/202; 350/288; 126/440; 126/442
[58] Field of Search ............... 126/271, 270; 237/1 A; 350/199, 202, 288

[56] References Cited
U.S. PATENT DOCUMENTS

| 4,068,474 | 1/1978 | Dimitroff | 126/271 |
| 4,068,653 | 1/1978 | Bourdon et al. | 350/288 |
| 4,069,812 | 1/1978 | O'Neill | 126/271 |
| 4,084,581 | 4/1978 | Vigoureux | 126/271 |

*Primary Examiner*—Kenneth W. Sprague
*Attorney, Agent, or Firm*—David E. Brook; James M. Smith

[57] ABSTRACT

A solar energy concentrator comprising a cylindrical Fresnel lens, a specially shaped and positioned reflecting mirror, and a shaped tubular receptor for conveying the collected energy to terminals is described. These concentrators are arrayed parallel and contiguous to each other and oriented generally along an East-West line to receive the sun's radiant energy, and the lenses together with the special reflectors and designed to accomodate large elevation angle variations of the sun. The large acceptance angles achieved with the image collapsing concentrator, while at the same time maintaining a high concentration ratio, improves the reception of diffused as well as direct sunlight and the small surface area of receiving tubes diminishes the thermal radiation losses. A method for determining the shape and location of the special image collapsing reflector is described and applied to solar concentrators employing both lenses and reflectors of cylindrical and three dimensional forms.

12 Claims, 9 Drawing Figures

IMAGE COLLAPSING CONCENTRATOR AND METHOD FOR COLLECTING AND UTILIZING SOLAR ENERGY

BACKGROUND OF THE INVENTION

The present invention relates to the concentration and collection of radiant energy and more particularly a means for concentrating solar radiation without tracking the daily and seasonal motions of the sun.

Many devices have been developed to concentrate the radiation from the sun primarily to obtain elevated temperatures by converting the focused optical solar energy into heat. At higher temperatures the energy is more useful for heating dwellings, for doing useful work such as fueling steam turbines, and for the generation of electricity with pyroelectric devices. Large lenses and reflecting mirrors can be moved to continually point toward the sun and such tracking concentrators can attain very large concentration ratios and very high temperatures in a small focal region. However, the complication of moving and pointing mirrors or lenses have rendered tracking concentrators economically impractical for domestic heating and electrical power generation at homes or at other consumer locations.

Techniques have been advanced to concentrate the sun's optical flux without motion or tracking. Trough shaped reflectors which are oriented along East-West lines have been developed (U.S. Pat. No. 4,002,499) with acceptance angles in the elevation plane of 20° to 35°. These compound parabolic concentrators have large side walls making them structurally deep and they do not provide the acceptance angles in the elevation plane of approximately 50° needed to accomodate the annual angular variations of the sun.

Other mirrors and lenses with wide acceptance angles are available, such as convex circular cylinders and Fresnel lenses. However, their focal surfaces, where blackened tubes are located to absorb the radiant energy, are so large in order to intercept the incident sun's energy from all directions within the acceptance angles that thermal radiation from these large structures causes severe heat loss, loss of efficiency and reductions in temperatures in the focal zone. The image surface area to aperture area must be reduced to provide a high concentration ratio and high operating temperature. This task is particularly difficult when large acceptance angles are required.

Efforts have been made to obtain high concentration ratios for non-tracking concentrators with low to moderate acceptance angles. The employment of secondary mirrors with circular, elliptical and hyperbolic shapes has been done (U.S. Pat. Nos. 3,125,091 and 3,868,823) to improve the focusing of optical concentrators for a given direction of the sun, but are ineffective for a plurality of directions and, hence, do not significantly improve the acceptance angle of the concentrator. A method for switching in only the portions of the focal region directly heated by the sun by means of thermostatic controls (U.S. Pat. No. 3,915,148) has been devised for use with wide angle Fresnel lenses. This apparatus, in addition to the complexity of switches and thermostats, requires tubing and other heat radiating structures over the focal region adding the thermal inertia, increasing radiation losses, and making it difficult to insulate adjacent receiving tubes.

Thus, there exists a need for a new non-tracking non-switching solar concentrator which will shrink or collapse the optical focal region of a wide acceptance angle collector in order to reduce the size and number of tubes or electrical conversion surfaces while, at the same time, obtaining high concentration ratios, operating temperatures and efficiencies.

OBJECTS AND SUMMARY OF THE INVENTION

It is an object of the present invention, through an improved solar energy concentrator and method for constructing solar energy concentrators and collectors, to obtain useful heat and electricity more effectively and efficiently from solar energy.

It is another object of this invention to increase the acceptance angles in the elevation plane of non-tracking solar energy concentrators.

It is a further object of this invention to increase the concentration ratios of non-tracking solar energy concentrators.

Yet a further object of this invention is to reduce the size of tubing or other structures used to convert solar optical energy heat by the concentrator and to convey heated fluids which flow through the focal region of the concentrator and/or to reduce the size of electrical generating devices within or near the focal region or regions of the concentrator.

It is still another object of this invention to improve the aperture area efficiency of solar concentrators and reduce the thermal losses of the collector and concentrator.

It is yet a further object of this invention to increase the operating temperature of the solar concentrator.

It is still a further object of this invention to concentrate the diffused and multiply reflected sunlight together with the direct sun rays with the same solar energy concentrator.

It is yet a further object of this invention to reduce the size and mass of receiving tubes and other structures in the concentrator which are heated by solar energy in order to reduce the thermal inertia and shorten the warm-up time and further reduce the thermal losses of the concentrator.

It is also a further object of this invention to reduce the depth dimension of solar concentrators and collectors, and, thus, simplify construction and reduce volume of the concentrator.

A method of constructing a reflecting subreflector is invented and described which functions together with a primary lens or reflector of a solar energy concentrator to shrink the image size of such primary lenses or reflectors both in area and volume into a smaller focal region area and volume. The reflecting surface contour of this reflecting mirror, called the image collapsing subreflector, is determined through use of a mathematical generating function consisting of a family of tilted ellipses with the envelopes of this system of ellipses or portions of these ellipses or ellipsoids defining the shape and form of the image collapsing subreflector. The method requires knowledge of the geometric form of the focal region of the primary lens or reflector for the variations in sun directions in the acceptance angle intervals of interest. This information about the primary focal region shape is introduced analytically into the generating functions of the system of titled ellipses or ellipsoids for producing the contour of the image collapsing subreflector. An advantage of the method is that concentrators employing such image collapsing concentrators can have reductions in the size of focal regions or images where solar energy heated liquids or other solar energy converting devices are located. These smaller tubes or structures generally have less losses due to thermal radiation than for concentrators with comparable acceptance angles not employing image collapsing subreflectors. The method allows for improved control of the concentration ratios over the acceptance angle sectors and, for example, the concentration ratio at the edge of the acceptance angle zone can be enhanced for better reception in winter. By segmenting the image collapsing subreflector into a number of contiguous image collapsing subreflectors, each operating in different angular sectors, higher concentration ratios can be achieved and the subreflectors can be contoured to correct for primary lens aberrations in the angular sector covered by the subreflector and also compensate for the variations in focal lengths with azimuth angles which occur for dielectric lenses. The shaped volume of the collapsed image can be occupied by shaped tubes to intercept rays from all directions rather than only the front area of the receivers as is the case when tubes are placed directly in the focus of primary lenses and reflectors. Concentrators using the image collapsing subreflector are often flatter and shallower than other type wide acceptance angle concentrators resulting in structural economy. The preferred embodiments are cylindrical concentrators lying along an approximately East-West line on the earth with the primary focusing element a cylindrical Fresnel lens capable of sharply focusing in the elevation plane, sometimes known as the altitude direction, over an elevation angular interval of from 45° to 55°.

Fundamental physical limitations require that the theoretical upper limit of concentration ratio for a concentrator with a given aperture area decrease as the aceptance angle of the concentrator is increased. These upper limits of concentration ratio are usually not attained due to deficiencies in the optical properties of the concentrators and other defects. By the compound focusing of this invention utilizing a focusing lens or reflector in concert with a shaped subreflector herein called an image collapsing reflector and furthermore shaping the receiving tubes to correspond to the shape of the final focal region, these upper limits of concentration ratio for a given large acceptance angular range is more nearly realized.

A further advantage to the wide acceptance angles achieved by this invention is the simultaneous reception of scattered diffuse sunlight reflected from the earth's surface and clouds, etc., together with the direct rays of the sun for much larger angular intervals than for tracking and narrow acceptance angle non-tracking concentrators.

These and other objects and advantages of this present invention are more particularly set forth in the following detailed description, the appended claims and in the accompanying drawings.

DESCRIPTION OF THE PREFERRED EMBODIMENTS

Figure 1:
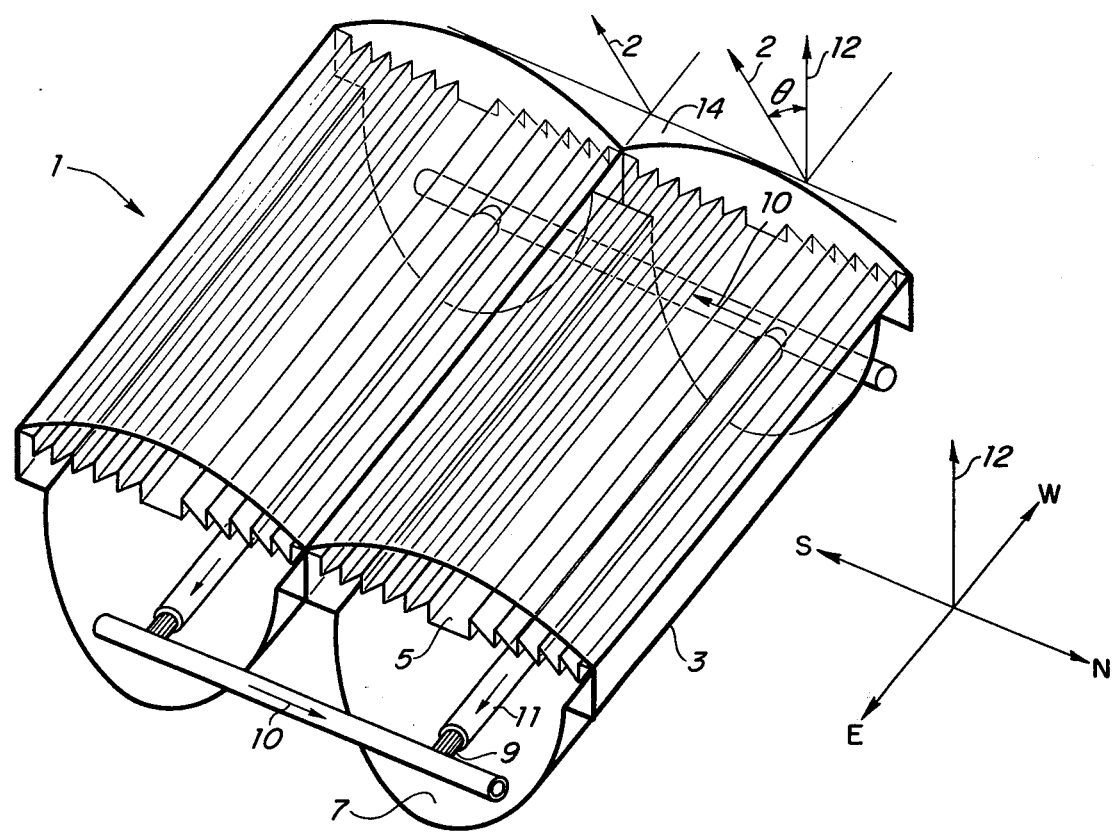
FIG. 1 is a perspective view of a deployment of the present invention showing orientation of the cylindrical form of the invention with respect to azimuth and elevation directions.

Referring first to FIG. 1, two concentrators 1 and 3 are shown arrayed together each having a lens 5, an especially shaped and polished subreflector 7, and a tube 9 which is surrounded by transparent evacuated glass tubing 11. The lens 5, subreflector 7 and tubings 9 and 11 are of uniform cross sections and comprise the cylindrical concentrator which is usually oriented such that the tube 9 and all cylindrical portions lie parallel to an East-West line represented on FIG. 1 by letters E and W. The aperture plane 14 of the concentrator is tilted by some elevation angle $\theta$ from the vertical or zenith direction indicated by the arrow 12 such that a normal 2 to the aperture plane 14 is pointed generally at the sun at noon time. Because the elevation directions of the sun vary daily and seasonally, the concentrator's normal 2 usually is oriented in a fixed position such that 2 is directed at the average or median position of the sun over its annual excursions. The tube 9 can be circular in cross section or of another shape cross section which is effective in intercepting rays of the sun's energy focused by the lens 5 directly on the tube 9 or reflected by the subreflector 7 on to 9. The surface of the tube 9 is usually covered with optically absorbing or black material and composed of metal when conversion of solar energy to heat is required or composed of electrically active material when conversion of solar energy to electricity is required. Both heat and electricity can be obtained at the same time when the tubing is both thermally and electrically active in converting sun's radiant energy. Usually a large number of individual concentrators are arrayed together to increase the aperture area of the collecting systems and the quantity of energy collection. The ends of the tube 9 are usually provided with tubes 10 through which oils or other liquids flow as indicated by arrows to convey heat to appliances or storage for various uses such as heating buildings or driving steam engines.

Figure 2:
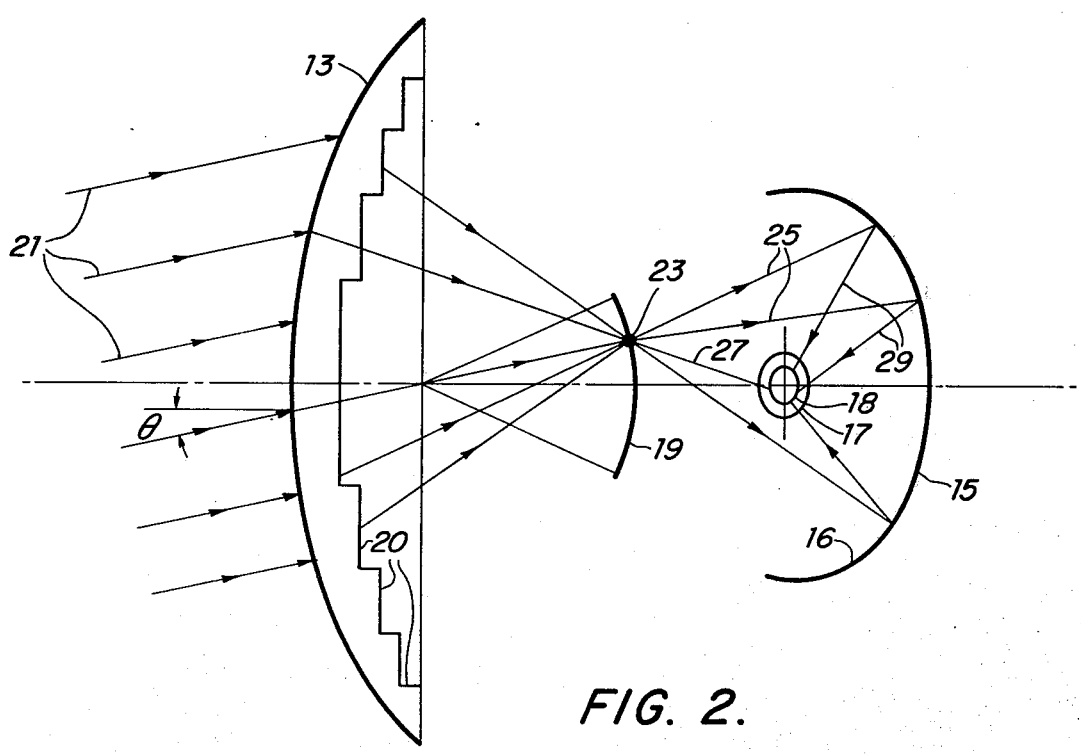
FIG. 2 is a diagrammatic view showing a typical cross section of a preferred embodiment of the present invention.

There is shown in FIG. 2 cross-sectional diagram a preferred embodiment of the present invention comprising a cylindrical Fresnel lens 13, an image collapsing reflector 15 and tube 18 which is surrounded by the transparent tube 17. The lens 13 is constructed of steps 20 to reduce weight and the lens material, its contours and steps are selected and constructed to focus the direct and diffuse energy of the sun on the approximately circular focal arc 19 for variations of approximately plus or minus 23 degrees of elevation angles $\theta$ of the sun. For each elevation angle $\theta$ the sun's rays 21 are focused to a point 23 from whence the rays 25 are reflected from the especially curved reflector 15 such that the rays 29 in general intercept the tube 18 or rays such as 27 directly impinge on the tube 18. An important advantage of the present invention is that the surface of the tube 18 can be significantly smaller than the surface area of the focal arc 19, especially when the focal arc 19 is further enlarged with tubes to convey heat collected to ports at the end of the tubes.

Figure 4:
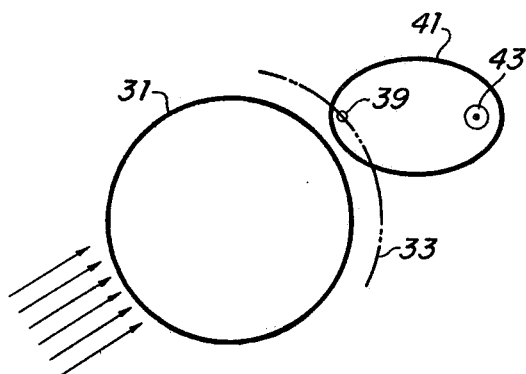
Figure 5:
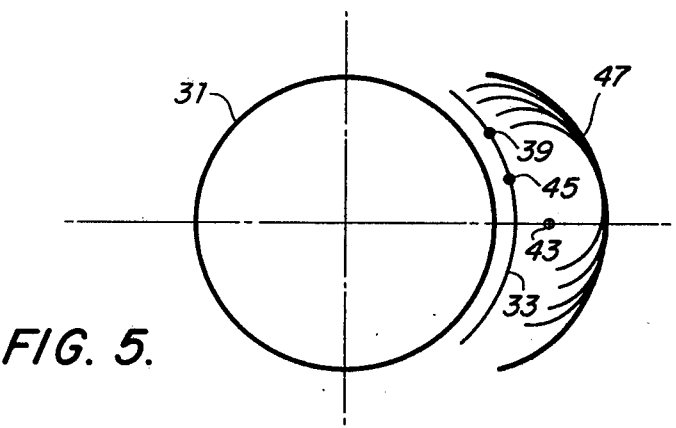

When the sun is in any position within the elevation acceptance angles of interest from the normal 12 to the lens aperture plane it is the unique quality of the image collapsing reflector 15 that the rays proceeding through the lens 13 and reflected from the inner surface of reflector 16 will in general strike the tube 18. The tube 18 can be circular or elliptical in cross section but more generally its shape is determined to intercept the maximum number of rays averaged over all elevation angles of interest while minimizing the surface area of the tube for minimum heat loss. The inner surface 16 of the reflector 15 which reflects the rays 25 onto the tube 18 must be of polished metal of high reflectivity for optical energy. Suitable materials are aluminum and silver. The teachings of this invention which determine the special contour of 15 are illustrated in FIGS. 3, 4, and 5 and further explained by mathematical formulas and examples.

Figure 3:
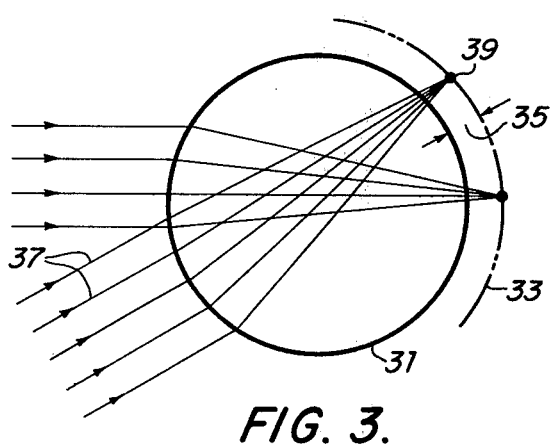
FIGS. 3, 4, and 5 are diagrams illustrating the method of image collapsing used in this invention.
Figure 6:
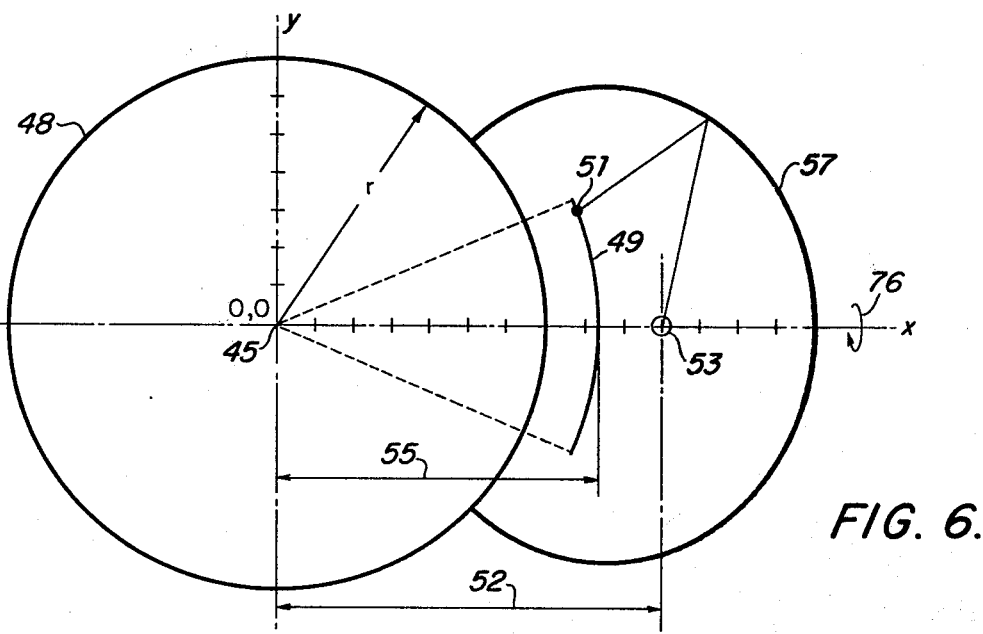
FIG. 6 is a cross-sectional diagram of the present invention employing a converging cylindrical lens.

In FIG. 3 is illustrated a simple lens 31 consisting of a right circular cylinder of dielectric material whose dielectric constant can be approximately 2.55. Such a lens will focus sharply on a circular focal arc 33 at a small distance 35 outside the lens on the opposite side of the lens from the incident sun's rays 37 at a spot 39 or focus F. We can construct an ellipse 41 as shown in FIG. 4 with one focus at 39 and another at 43. All rays passing through 39 will now be reflected by 41 to pass through 43. Because we are interested in a plurality of sun's location and hence ray directions, the ellipse 41 or portions thereof will not focus rays to point 43 which are not focused to point 39. However, as illustrated in FIG. 5, when the envelope of a family of ellipses is constructed each with one focus at 43 but with the other focus along the focal arc 33, for example point 45, the envelop curve 47 will approximately focus all rays on the focal arc 33 to a small region surrounding the point 43. Parametric equations can be derived for the enveloping curve used to collapse the focal region of a lens or reflector to a small region about a point even when the focal arc of the primary lens is not a circle but some arbitrary curve, and the converging or diverging lens is not a cylinder as the dielectric rod lens used in this illustration. The examples to be given, however, clearly show the utility of the method for collapsing the images of either lens or reflector type solar concentrators for improved acceptance angles and concentration ratios. When coordinates x, y measured from the origin 45, as shown in FIG. 6, are at the center of lens 48 that focus on circular arc 49 a distance 52 which is represented as $c_1$ from the origin then an ellipse needed to focus rays passing through a general point 51 with coordinates $x_1 y_1$ on to point 53 can be expressed as $$\sqrt{(x-a)^2+y^2}+\sqrt{(x-x_1)^2+(y-y_1)^2}=c_2$$

where a is the distance 55 to the tube center from the origin 45 in FIG. 6 and $x_1$, $y_1$ are coordinates of the circular focal arc 49 for the special case that the primary lens focuses on a circle.

Therefore, $x_1^2 + y_1^2 = c_1^2$. Generally $c_2$ has a fixed value at the disposal of the designer.

Differentiating the expression equaling $c_2$ and using the special condition that the focal arc is circular, we can show that the coordinates for image collapsing reflector 57 can be calculated from the equations $$x = \frac{[(c_1 + c_2)^2 - a^2] x_1}{2c_1(c_1 + c_2) - 2ax_1}$$

$$y = \frac{xy_1}{x_1}$$

when y is greater than $y_1$ and from $$x = \frac{[(c_1 - c_2)^2 - a^2] x_1}{2c_1(c_1 - c_2) - 2ax_1}$$

$$y = \frac{xy_1}{x_1}$$

when $y_1$ is greater than y and equations of the tangent ellipses can be calculated from $$y = \frac{-B \pm \sqrt{B^2 - 4AC}}{2A}$$

where $A = (c_2^2 - y_1^2)$ $B = -2K_2 y_1$ $$K_2 = \frac{c_2^2 + a^2 - c_1^2}{2} + (x_1 - a) x$$

$C = c_2^2(x-a)^2 - K_2^2$

For example, for the concentrator shown in FIG. 6, when $a = 2.2$ inches $c_1 = 1.97$ inches and $c_2 = 1.23$ inches and the image collapsing reflector is terminated in a tangent ellipse for rays incident at plus and minus 23° the coordinates of 57 can be as shown in Table I.

Figure 7:
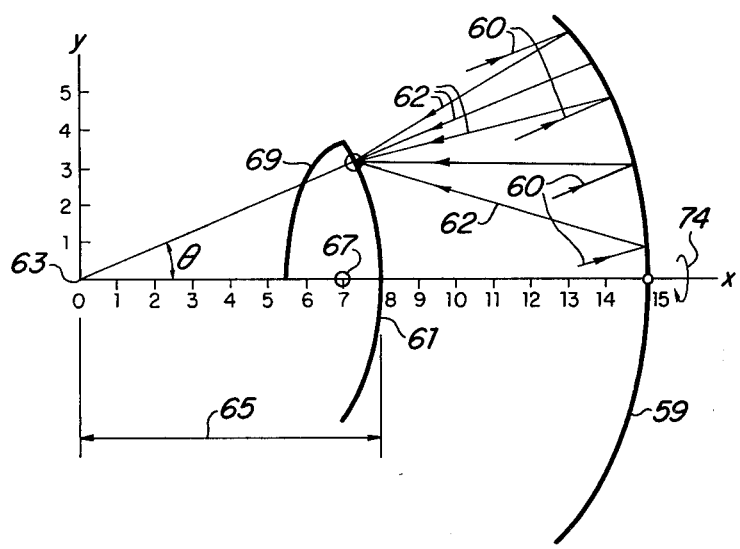
FIG. 7 is a cross-sectional diagram of the present invention employing a primary reflector.

Likewise, referring to FIG. 7, when the cylindrical concentrator consists of a primary concaved cylindrical reflector 59 focusing the sun's ray 60 by reflected rays 62 to a circular focal arc 61 whose radius measured from origin 63 of coordinates x and y is $c_1 = 7.8''$ as shown by distance 65 when the center of tube 67 is at 7.0'' from the origin and $c_2$ is 3.8 inches, then the collapsing reflector 69 can have coordinates as given by Table II when for sun angles greater than plus and minus $\theta = 23°$ from the axis OX the reflector 69 is terminated by the sections of ellipses with focuses at 7.0 and the points $x_1 = 6.216$ and $\pm y_1 = 2.638$.

| TABLE I | | TABLE II | |
|---|---|---|---|
| POSSIBLE COORDINATE POINTS FOR IMAGE COLLAPSING REFLECTOR OF FIG. 6 | | POSSIBLE COORDINATE POINTS FOR IMAGE COLLAPSING REFLECTOR OF FIG. 7 | |
| x (inches) | y (inches) | x (inches) | y (inches) |
| 2.700 | 0.000 | 5.500 | ±0.000 |
| 2.695 | ±0.094 | 5.504 | ±0.192 |
| 2.679 | ±0.187 | 5.518 | ±0.386 |
| 2.653 | ±0.279 | 5.541 | ±0.582 |
| 2.618 | ±0.358 | 5.573 | ±0.783 |
| 2.573 | ±0.454 | 5.615 | ±0.990 |
| 2.520 | ±0.536 | 5.669 | ±1.205 |
| 2.459 | ±0.613 | 5.734 | ±1.430 |
| 2.392 | ±0.686 | 5.812 | ±1.667 |
| 2.318 | ±0.753 | 5.905 | ±1.919 |

| TABLE I | | TABLE II | |
|---|---|---|---|
| POSSIBLE COORDINATE POINTS FOR IMAGE COLLAPSING REFLECTOR OF FIG. 6 | | POSSIBLE COORDINATE POINTS FOR IMAGE COLLAPSING REFLECTOR OF FIG. 7 | |
| x (inches) | y (inches) | x (inches) | y (inches) |
| 2.224 | ±0.815 | 6.015 | ±2.189 |
| 2.158 | ±0.872 | 6.143 | ±2.482 |
| 2.111 | ±0.898 | 6.216 | ±2.638 |
| 2.000 | ±0.9498 | 6.400 | ±2.954 |
| 1.900 | ±0.968 | 6.600 | ±3.180 |
| 1.800 | ±0.960 | 6.800 | ±3.324 |
| | | 7.000 | ±3.402 |

It is not necessary that the lens or reflector focus to a circular arc but only that the coordinates of the focal arc $x_1$, $y_1$ are known. Likewise, the constant $c_2$ can be varied with the positions $x_1$ and $y_1$ giving another degree of freedom in the application of the method. In general the parameters a and $c_2$ and the cross section of the tube 67 are selected based on ray tracing experience to minimize the size region around a where rays are concentrated for a given acceptance angle range which, in the example is plus 23° to minus 23°.

Figure 8:
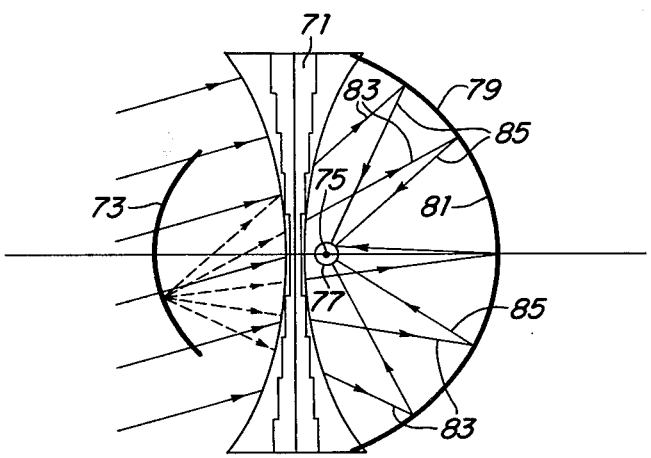
FIG. 8 is a cross-sectional diagram of the present invention employing a divergent cylindrical Fresnel lens.

In order to reduce the depth of the concentrator a lens with a virtual focal surface, such as produced by a divergent Fresnel lens, can be employed with an image collapsing reflector to obtain a high concentration ratio. In FIG. 8 is illustrated a diverging lens with focus along an arc 73. The point images on the virtual image 73 can be chosen as focal points of a system of ellipses all of which have a common focus point 75 which is the center of a receiver tube 77. The envelope of these ellipses 79 is the image collapsing subreflector and it can be constructed with polished mirror inner surface 81 which reflects the family of rays 83 into a small region near 75 by means of rays 85.

Although cylindrical or two dimensional reflectors and lens are frequently employed for solar energy applications because they usually focus to a line for all azimuth (East-West motion) angles of the sun, point-focusing or three dimensional lens systems are also of utility. The image collapsing method described for cylindrical systems can be extended to point-focusing lenses and reflectors which can best be described in three dimensional coordinates y, x, and z. An ellipsoid generating function $$\sqrt{(x-a)+y^2+z^2} + \sqrt{(x-x_1)^2+(y-y_1)^2+(y-z_1)^2} = c_2$$

can be defined and focal surface $x_1$, $y_1$, $z_1$ collapsed to a smaller region around the point $x=a$, $y=z=0$. For example, when the curve 59 of FIG. 7 is a circle forming a concave reflector, it can be rotated about the axis OX as indicated by arrow 74 to form a spherical cap rather than a cylindrical reflector as previously described. Likewise, due to the symmetry of a sphere, the focal curve 61 and the image collapsing reflector 69 can be rotated also about OX and the resulting shapes will focus the energy incident on the spherical cap whose cross section is 59 on to a small region 67 around point a.

The blocking of a subreflector in front of a primary reflector reduces the aperture efficiency of the concentrator. Such blocking is absent for lens type concentrators and is generally less for point-focusing reflectors than for cylindrical line focusing reflector concentrators. Therefore, point focusing reflectors are of utility because they usually have higher concentration ratios and less blocking than cylindrical reflectors although total acceptance angles in azimuth and elevation direction is generally inferior to that of cylindrical concentrators.

Likewise, when the lens of FIG. 6 focuses approximately to a point and these points form a spherical surface for the sun in different positions in direction within a given solid acceptance angle surrounding the lens axis, then the image collapsing curve calculated for the cylindrical case can be rotated about the lens axis to form the surface of the image collapsing reflector for a symmetric point-focusing lens, as indicated by the curved arrow 76 rotating about the axis OX.

Figure 9:
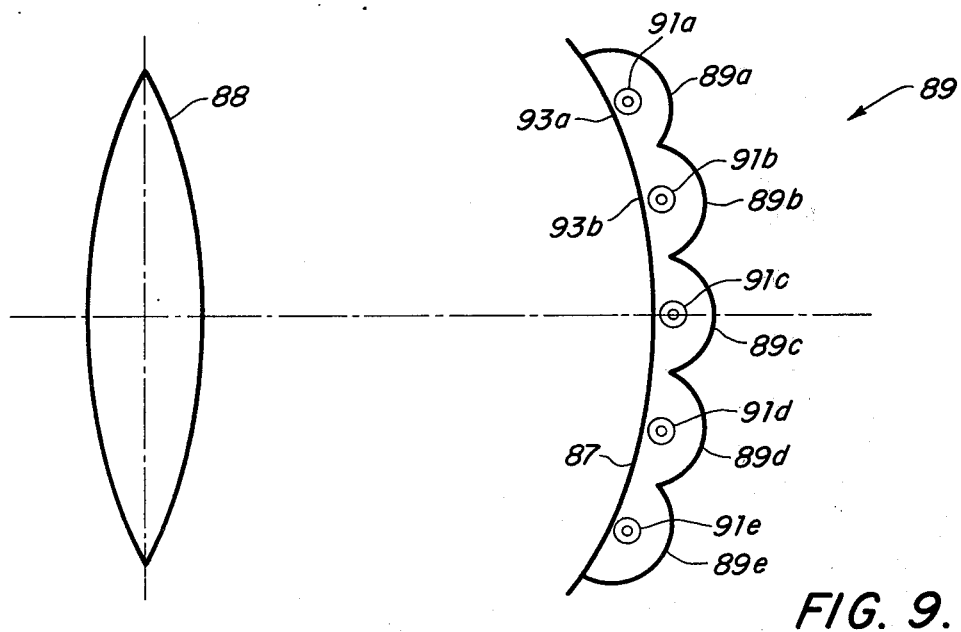
FIG. 9 is a cross-section diagram of the present invention employing a segmented form of the image collapsing subreflector.

Referring to FIG. 9, when the primary lens 88 or reflector of the concentrator produces a focal arc or surface 87 then the image collapsing curve 89 can be segmented to form subreflecting mirrors 89A, 89B, 89C and 89D. These segments are shaped using the method already described with tubes 91A, 91B, 91C and 91D being located at collapsed images from sectors of the focal arc 87. This embodiment has the advantage of higher concentration ratios than when one image collapsing subreflector is used for the entire focal arc 87. The individual subreflectors 89A–D can be shaped to correspond to sectors of 87 more or less in front as shown by sectors 93A, 93B of the primary focal surfaces and the subreflectors 89A–D can be shaped to correspond to vagaries of the focal curve for each sector of the focal curve such as due to aberrations and defocusing of the primary lens or reflector. In dielectric lenses the focal length for morning and evening azimuth locations of the sun is different than for noon day location when the sun is at the highest elevation angles. By circulating liquids through different tubes at different times of the day the concentrator can be adjusted for these variations. Switching by proper hourly programming from tubes 91A through 91D or, of course, for larger or smaller segments over any focal surface will result in better aperture efficiencies, higher concentration ratios, and higher temperatures than when only one image collapsing subreflector is employed.

After the shape and position of the collapsing mirror has been calculated using the analytical procedures and equation herein described, the performance of the concentrator can be examined by tracing rays using laser rays for example, or by analytic determination or ray path using Snell's law at surfaces and boundaries of the lenses and reflectors. The geometric region spot size where the majority of rays are intercepted (within the desired acceptance angles of the concentrator) determines the tube size and tube shape. Also, the parameters of the primary lens or reflector and the values of a and $c_2$ of the image collapsing reflector can all be varied to reduce the spot size and the cross-sectional area of the receiver tube located within this region.

Those skilled in the art will recognize, or be able to ascertain using no more than routine experimentation, many equivalents to the specific elements described herein. Such equivalents are intended to be covered by the following claims.

What is claimed is:

1. In a solar energy concentrator having a primary optically focusing component and a tubular receptor and wherein said priary optically focusing component focuses incident radiation onto said tubular receptor, the improvement of additionally providing in said concentrator a subreflector designed to collapse the image size from the primary optically focusing component wherein said subreflector has a shape conforming to the mathematical principle of envelopes using a family of ellipses or ellipsoids as generating curves.

2. A concentrator in accordance with claim 1 wherein the concentrator consists of a primary optical focusing component in the form of a converging Fresnel lens and a shaped image collapsing subreflector whose reflecting surface is shaped according to the envelop of a family of titled ellipses or ellipsoids each of which focuses on a common region and also on portions of the primary focal region of the converging Fresnel lens, and a collecting tube whose shape is determined by the location of the maximum density of ray reflected by the image collapsing subreflector and whose surface is blackened to absorb sunlight and which shaped tube is surrounded by an evacuated glass tubing such that a partial vacuum reduces heat losses from the heated tube.

3. A concentrator in accordance with claim 1 wherein the concentrator consists of a diverging Fresnel lens as the primary optical focusing component and a shaped image collapsing subreflector and a shaped collecting tube whose surface is blackened to absorb sunlight and which shaped tube is surrounded by an evacuated glass tubing such that a partial vacuum reduces heat losses from the heated tube.

4. A concentrator in accordance with claim 1 wherein the concentrator consists of a lens as the primary optical focusing component in the form of a right circular cylinder of dielectric with dielectric constant which can be 2.55 and a shaped image collapsing subreflector and a shaped collecting tube whose surface is blackened to absorb sunlight and which shaped tube is surrounded by an evacuated glass tubing such that a partial vacuum reduces heat losses from the heated tube.

5. A concentrator in accordance with claim 1 wherein the primary optically focusing component consists of primary reflector in the form of a concaved circular cylinder.

6. A concentrator constructed in accordance with claim 1 wherein the concentrator consists of a lens as the primary focusing component which focuses the sun's rays to a small spot and whose focal surface generated for a range of azimuth and elevation angles is collapsed by an image collapsing shaped subreflector to a shaped collecting surface smaller than the primary focal surface.

7. A concentrator constructed in accordance with claim 1 wherein the concentrator consists of a reflector which focuses the sun's rays to a small spot and whose focal surface generated by a range of different elevation and azimuth angular positions of the sun is collapsed by an especially shaped and positioned image collapsing subreflector onto an especially shaped collecting surface.

8. A concentrator constructed in accordance with claim 1 wherein the concentrator consists of a primary optical focusing component producing a focal surface and a shaped image collapsing subreflector whose form is segmented into contiguous shaped subreflectors each of which is contoured after the envelop of a system of titled ellipses or ellipsoids to collapse a portion of the image of the primary optical focusing component onto a small shaped region containing a tube whose shape conforms to the contours of the collapsed focal region produced by each segment of the image collapsing subreflector; the improvement of additionally providing segmented forms of the image collapsing subreflector being to further reduce the size of the energy converting and collecting tubes in order to increase the concentration ratio of the concentrator and its operating temperatures.

9. The concentrator of claim 8 wherein each tube in the focal region of the collapsed images of the segments of the image collapsing subreflector is switched into or out of a collecting system connected to the terminals of each tube consisting of flowing liquids heated by the concentrator and delivered to terminals utilizing the heat collected, such sequence of switching being done in order to bring the sun's rays onto the tube or tubes switching into the collecting systems for a given hour of the day or season of the year.

10. A method of collecting solar energy comprising the steps of:
focusing solar rays into an image by means of a primary wide angle, optically focusing component, and
collapsing the image from the primary component onto a receiving element by means of a subreflector having a shape conforming to the mathematical principle of envelopes with a family of ellipses or ellipsoids as generating curves.

11. A method of collecting solar energy as claimed in claim 10 wherein the primary optically focusing component and the subreflector are of cylindrical form.

12. A method of collecting solar energy as claimed in claim 10 wherein the primary optically focusing component and subreflector face toward the average position of the noontime sun.

* * * * *